(12) United States Patent
Sirohey et al.

(10) Patent No.: US 7,953,265 B2
(45) Date of Patent: May 31, 2011

(54) METHOD AND SYSTEM FOR AUTOMATIC ALGORITHM SELECTION FOR SEGMENTING LESIONS ON PET IMAGES

(75) Inventors: Saad Ahmed Sirohey, Pewaukee, WI (US); Istvan Ubelhart, Budapest (HU); Balazs Cziria, Szazhalombatta (HU)

(73) Assignee: General Electric Company, Schenectady, NY (US)

( * ) Notice: Subject to any disclaimer, the term of this patent is extended or adjusted under 35 U.S.C. 154(b) by 1225 days.

(21) Appl. No.: 11/603,861

(22) Filed: Nov. 22, 2006

(65) Prior Publication Data

US 2008/0118134 A1    May 22, 2008

(51) Int. Cl.
*G06K 9/00* (2006.01)

(52) U.S. Cl. ........ 382/131; 382/100; 382/128; 382/173; 600/407; 600/410

(58) Field of Classification Search .......................... None
See application file for complete search history.

(56) References Cited

U.S. PATENT DOCUMENTS

| | | | |
|---|---|---|---|
| 7,006,677 B2 | 2/2006 | Manjeshwar et al. | |
| 2003/0174872 A1* | 9/2003 | Chalana et al. | 382/128 |
| 2003/0194119 A1* | 10/2003 | Manjeshwar et al. | 382/131 |
| 2005/0102315 A1* | 5/2005 | Krishnan | 707/102 |
| 2005/0251014 A1* | 11/2005 | Qian et al. | 600/407 |
| 2005/0276455 A1* | 12/2005 | Fidrich et al. | 382/128 |
| 2006/0052690 A1* | 3/2006 | Sirohey et al. | 600/420 |
| 2007/0276214 A1* | 11/2007 | Dachille et al. | 600/407 |

FOREIGN PATENT DOCUMENTS

WO    WO2005/055008    *    6/2005

OTHER PUBLICATIONS

Yong et al. "Learning-based algorithm selection for image segmentation", Nov. 2004, Pattern Recognition Letters 26, pp. 1059-1068.*

* cited by examiner

*Primary Examiner* — Sath V Perungavoor
*Assistant Examiner* — Jason Heidemann
(74) *Attorney, Agent, or Firm* — Dean Small; The Small Patent Law Group

(57) ABSTRACT

A method and system is provided for automatically processing a volumetric diagnostic image dataset. A first seed point is defined within a lesion. The lesion is within a first image dataset representative of a subject. A first boundary is defined in three dimensions within the first image dataset and the first seed point and the lesion are within the first boundary. At least one parameter is determined based on the first image dataset. A first segmentation algorithm is selected from a plurality of segmentation algorithms based on the at least one parameter, and the lesion is segmented using the first segmentation algorithm.

14 Claims, 7 Drawing Sheets

METHOD AND SYSTEM FOR AUTOMATIC ALGORITHM SELECTION FOR SEGMENTING LESIONS ON PET IMAGES

BACKGROUND OF THE INVENTION

This invention relates generally to processing image data acquired using a positron emission tomography (PET) system, and more particularly, to segmenting lesions within PET image datasets.

There is no single generally accepted algorithm for segmenting lesions on PET images that works well under all conditions. Based on the type of the lesion, the location of the lesion in the patient's body, and the general PET image characteristics, such as noise, average standardized uptake values (SUV) levels, and a variety of artifacts which may be present in the image, the quality of the segmentation varies.

Typically, the user may need to manually select and fine-tune a segmentation algorithm from a plurality of algorithms to best fit the context of a particular image. This is time consuming, requires a high level of expertise, and the image may need to be reprocessed if the segmentation is not correct.

Also, the lesions of interest may be imaged over a period of time as a patient is followed during the course of tracking a pathology or treatment. It is desirable to compare the image datasets acquired over time to identify changes. However, the segmentation algorithm used in one or more prior images may not work correctly on a subsequent image dataset of the same anatomy. It is therefore necessary for the user to repeat the manual process of selecting and fine-tuning the segmentation algorithm to fit the context of the latest image.

Therefore, a need exists for automatically identifying a segmentation algorithm which bests fits the given context of a PET image dataset. Certain embodiments of the present invention are intended to meet these needs and other objectives that will become apparent from the description and drawings set forth below.

BRIEF DESCRIPTION OF THE INVENTION

In one embodiment, a method for automatically processing a volumetric diagnostic image dataset comprises defining a first seed point within a lesion. The lesion is within a first image dataset representative of a subject. A first boundary is defined in three dimensions within the first image dataset and the first seed point and the lesion are within the first boundary. At least one parameter is determined based on the first image dataset. A first segmentation algorithm is selected from a plurality of segmentation algorithms based on the at least one parameter, and the lesion is segmented using the first segmentation algorithm.

In another embodiment, a system for automatically segmenting a lesion within a PET image dataset comprises a display for displaying a volumetric PET image dataset of a subject. An input device defines a seed point within a lesion on the image dataset. A CPU is coupled to the display and the input device to define a three dimensional bounding box around the lesion within the image dataset. A segmentation algorithm selection module is coupled to the CPU and is configured to detect at least one parameter associated with at least one of image data within the image dataset and data associated with the subject. The selection module selects a segmentation algorithm from a predetermined list of segmentation algorithms based on the at least one parameter. The CPU segments the lesion with the segmentation algorithm.

In another embodiment, a method for automatically selecting an algorithm for processing a volumetric image dataset comprises propagating a bookmark from a first dataset to a second dataset. The first and second datasets comprise like anatomy. The bookmark defines a seed point within a lesion on the first dataset and a bounding box surrounding the lesion within the first dataset. At least one first and second parameter is determined based on the first and second datasets, respectively. The at least one first and second parameters are compared to identify a difference beyond a predetermined threshold. A segmentation algorithm is selected based on the at least one first and second parameters and the difference.

DETAILED DESCRIPTION OF THE INVENTION

Figure 1:
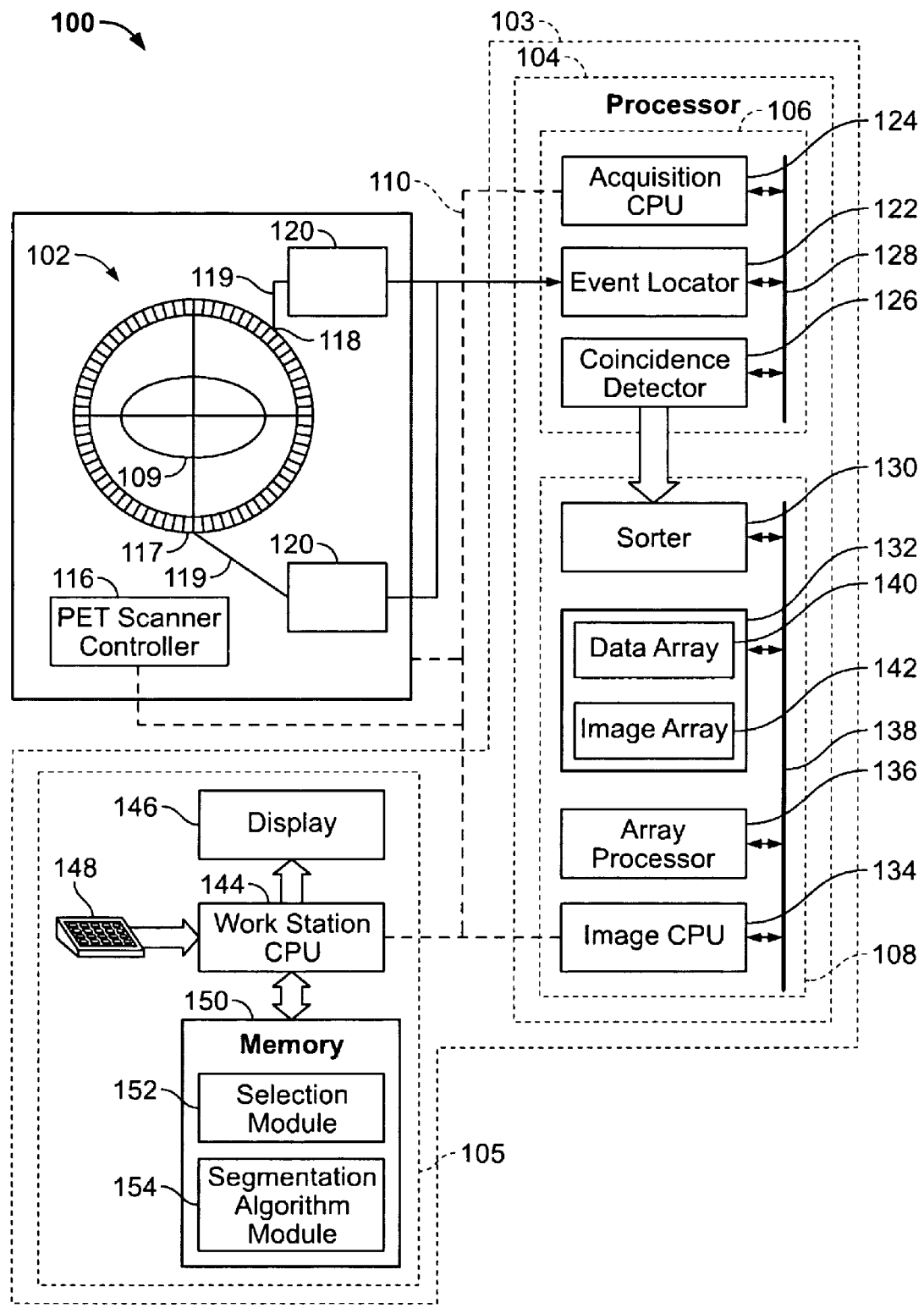
FIG. 1 illustrates a block diagram of an exemplary positron emission tomography (PET) system in accordance with an embodiment of the present invention.

The foregoing summary, as well as the following detailed description of certain embodiments of the present invention, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor, random access memory, hard disk, or the like). Similarly, the programs may be stand alone programs, may be incorporated as subroutines in an operating system, may be functions in an installed software package, and the like. It should be understood that the various embodiments are not limited to the arrangements and instrumentality shown in the drawings.

FIG. 1 is a block diagram of an exemplary embodiment of a positron emission tomography (PET) system 100 in which various embodiments of the invention may be implemented. PET system 100 includes a plurality of detector ring assemblies. One such detector ring assembly, detector ring assembly 102, is illustrated in FIG. 1. PET system 100 further includes a controller 103 to control normalization and image reconstruction processes. Controller 103 includes a processor 104 and an operator workstation 105. Processor 104 includes a data acquisition processor 106 and an image reconstruction processor 108, which are interconnected via a communication link 110. PET system 100 acquires scan data and transmits the data to data acquisition processor 106. The scanning operation is controlled from operator workstation 105. The data acquired by data acquisition processor 106 is reconstructed using image reconstruction processor 108.

Detector ring assembly 102 includes a central opening, in which an subject 109 may be positioned, using, for example, a motorized table, that is aligned with the central axis of detector ring assembly 102. This motorized table moves the subject 109 into the central opening of detector ring assembly 102 in response to one or more commands received from operator workstation 105. A PET scanner controller 116, also referred to as the gantry controller, is provided (e.g., mounted) within PET system 100. PET scanner controller 116 responds to the commands received from operator workstation 105 through communication link 110. Therefore, the scanning operation is controlled from operator workstation 105 through PET scanner controller 116.

Detector ring assembly 102 includes a plurality of detector units (e.g., in the GE Discovery™ ST PET system, there are 420 crystals per ring, and 24 rings in the scanner). For example, detector ring assembly 102 includes a detector 117, a detector 118, and several other detectors. Detector 117, like the other detectors, includes a set of scintillator crystals arranged in a matrix that is disposed in front of a plurality of photomultiplier tubes (e.g., four tubes). When a photon collides with a crystal on a detector, it produces a scintilla on the crystal. Each photomultiplier tube produces an analog signal on communication line 119 when a scintillation event occurs. A set of acquisition circuits 120 is provided to receive these analog signals. Acquisition circuits 120 produce digital signals indicating the 3-dimensional (3D) location and total energy of the event. Acquisition circuits 120 also produce an event detection pulse, which indicates the time or moment the scintillation event occurred. These digital signals are transmitted through a communication link, for example, a cable, to an event locator circuit 122 in data acquisition processor 106.

Data acquisition processor 106 includes event locator circuit 122, an acquisition CPU 124 and a coincidence detector 126. Data acquisition processor 106 periodically samples the signals produced by acquisition circuits 120. Acquisition CPU 124 controls communications on a back-plane bus 128 and on communication link 110. Event locator circuit 122 processes the information regarding each valid event and provides a set of digital numbers or values indicative of the detected event. For example, this information indicates when the event took place and the position of the scintillation crystal that detected the event. An event data packet is communicated to coincidence detector 126 through back-plane bus 128. Coincidence detector 126 receives the event data packets from event locator circuit 122 and determines if any two of the detected events are in coincidence. Coincidence is determined by a number of factors. First, the time markers in each event data packet must be within a predetermined time period, for example, 12.5 nanoseconds, of each other. Second, the LOR formed by a straight line joining the two detectors that detect the coincidence event should pass through the field of view in PET system 100. Events that cannot be paired are discarded. Coincidence event pairs are located and recorded as a coincidence data packet that is communicated through a communication link to a sorter 130 in image reconstruction processor 108.

Image reconstruction processor 108 includes sorter 130, a memory module 132, an image CPU 134, an array processor 136 and a back-plane bus 138. Sorter 130 counts all events occurring along each projection ray and organizes them into 3D data. This 3D data (or sinograms) is organized in one exemplary embodiment as a data array 140. Data array 140 is stored in memory module 132. Back-plane bus 138 is linked to communication link 110 through Image CPU 134. Image CPU 134 controls communication through back-plane bus 138. Array processor 136 is also connected to back-plane bus 138. Array processor 136 receives data array 140 as an input and reconstructs images in the form of image arrays 142. Resulting image arrays 142 are stored in memory module 132.

The images stored in image array 142 are communicated by image CPU 134 to operator workstation 105. Operator workstation 105 includes a CPU 144, a display 146 and an input device 148. CPU 144 connects to communication link 110 and receives inputs (e.g., user commands) from input device 148. Input device 148 may be, for example, a keyboard, mouse, or a touch-screen panel. Through input device 148 and associated control panel switches, the operator can control the calibration of PET system 100 and the positioning of the subject 109 for a scan. Similarly, the operator can control the display of the resulting image on display 146 and perform image-enhancement functions using programs executed by workstation CPU 144.

In general, the data array received by array processor 136 is corrected for errors before being reconstructed. Once the reconstruction is complete, further processing, such as segmentation, may be accomplished based on the reconstructed image dataset, which may be stored in a memory 150. As discussed previously, no single segmentation algorithm works under all conditions, and it can be time consuming to determine an appropriate segmentation algorithm having appropriate parameters for the particular image and lesion. Therefore, a segmentation algorithm selection module 152 may be used to automatically identify a segmentation algorithm from within a segmentation algorithm module 154. The segmentation algorithm module 154 stores a plurality of segmentation algorithms. Optionally, one or more of the segmentation algorithms may be associated with one or more of a particular anatomy or pathology.

It should be understood that the processing of image datasets may be accomplished remote from the PET system 100. For example, the acquired PET image datasets may be transferred over a network, internet, by portable disk, and the like, for processing at a location such as on a separate workstation, computer, PACS review station and the like.

Figure 2:
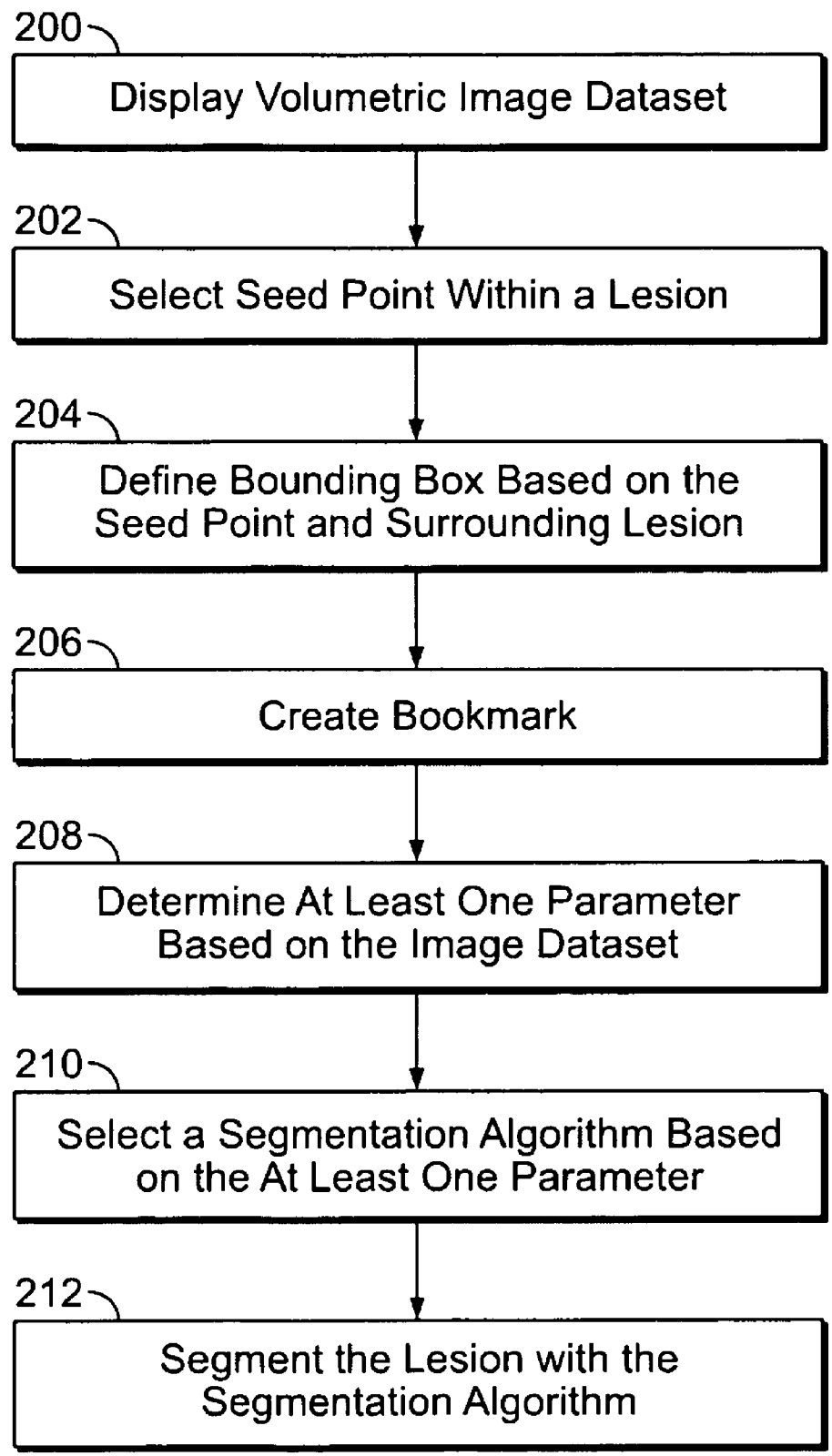
FIG. 2 illustrates a method for automatically selecting a segmentation algorithm for a volumetric PET image dataset based on contextual information in accordance with an embodiment of the present invention.
Figure 3:
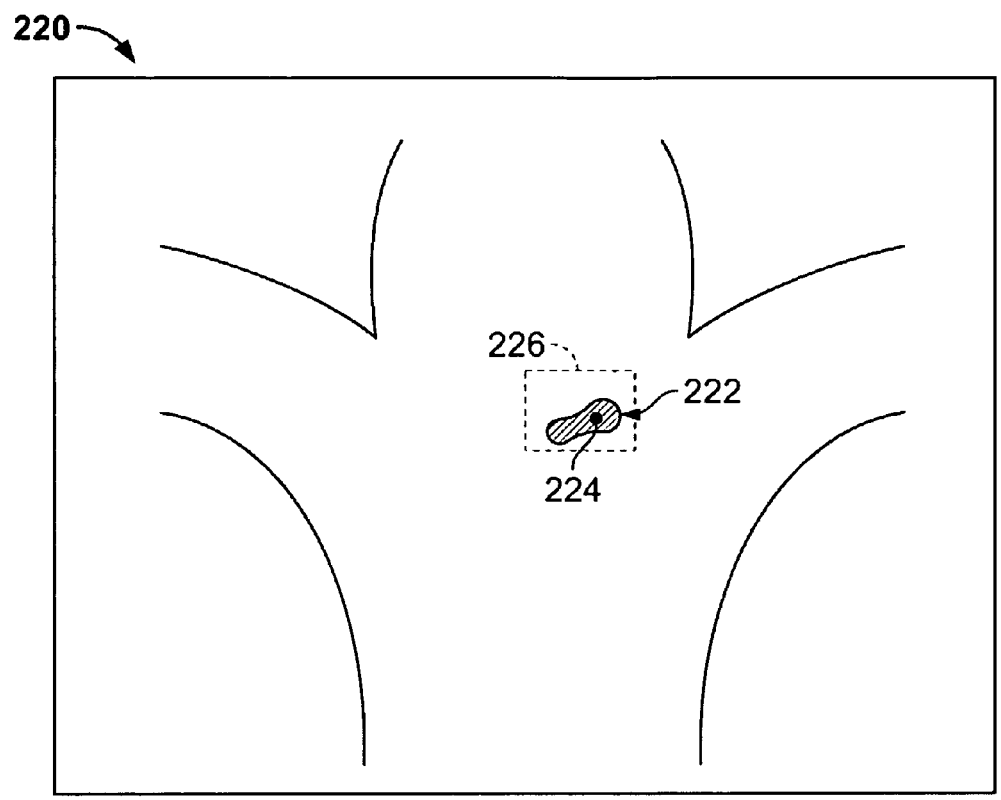
FIG. 3 illustrates an example of processing a volumetric PET image dataset in accordance with an embodiment of the present invention.

FIG. 2 illustrates a method for automatically selecting a segmentation algorithm for a volumetric PET image dataset based on contextual information. Contextual information may be related to the image dataset, the subject 109, treatment received by the subject 109, or other factors. FIG. 3 illustrates an example of processing a volumetric PET image dataset 220 which is displayed on the display 146.

At 200 of FIG. 2, the CPU 144 displays the image dataset 220 on the display 146. A lesion 222 (FIG. 3) is indicated, and the user wishes to segment the lesion 222 to identify various characteristics related to the lesion 222. Using the input device 148 (FIG. 1), at 202 of FIG. 2, the user selects a seed point 224 within the lesion 222. At 204, the CPU 144 defines a three-dimensional bounding box 226 surrounding the lesion 222 which is based on the seed point 224. Optionally, the user may modify the bounding box 226 with the input device 148, such as to change a size or position relative to the lesion 222. Alternatively, the user may manually define the bounding box 226 with the input device 148. Alternatively, the user may input one or more stop seed points upon which the bounding box 226 is based.

At 206, the segmentation algorithm selection module 152 (FIG. 1) creates a bookmark which may be propagated to other images of the lesion 222. The bookmark comprises information for propagating the seed point 224 and the bounding box 226 to another image.

At 208, the selection module 152 determines at least one parameter based on at least one of the image dataset 220 and information associated with the subject 109. For example, parameters related to the image dataset 220 may be based on image data within the bounding box 226 or within the entire body of the subject 109. Parameters may be as follows: average and/or maximum standardized uptake values (SUV) level and standard deviation of SUV in all or a portion of the body of the subject 109; average and/or maximum SUV level and standard deviation of SUV within the bounding box 226; anatomical location of the seed point 224; an organ the seed point 224 is defined within or proximate to; a pre-defined threshold level for one or more organ; a separation factor to minimize impact from a neighboring high-uptake organ or structure; and preliminary statistics of the lesion 222 based on results of a pre-segmentation algorithm, such as number of components, size, volume, regularity vs. irregularity, and the like. It should be understood that other parameters associated with the image data may be used.

The selection module 152 may also use other non-image data and information associated with the subject 109. For example, one or more acquisition parameters used when acquiring the image dataset 220, disease history based on the subject 109, treatment history of the subject 109, and expected results of the treatment of the subject 109 may be considered and used as a parameter. Some parameters may be retrieved from electronic information stored with the subject's images or manually input by the user. Optionally, the user may identify or select one or more user-defined parameters to be used by the selection module 152 when selecting the segmentation algorithm. The user-defined parameters may be based on user experience, user preference, the type of scan acquired, the anatomy and/or lesion 222 being scanned, and the like.

At 210, the selection module 152 selects a segmentation algorithm from within the segmentation algorithm module 154 based on the at least one parameter. Therefore, one or more of the parameters based on the context of the image dataset 220, and optionally non-image data, may be used to select the segmentation algorithm. For example, using two parameters may provide for a most accurate result compared to using a single parameter. By way of example, the segmentation algorithms may be one of, and not restricted to: a threshold based segmentation where the parameter is the ambient noise of the image; a watershed segmentation where the gradient threshold may be determined by the histogram of the gradients around the object in question; and an adaptive threshold based segmentation algorithm where the adaptive algorithm used is expectation maximization algorithm and the cutoff criterion is derived from the histogram of the gradients in the image.

At 212, the CPU 144 segments the lesion 222 using the segmentation algorithm selected at 210. The result may be displayed on the display 146.

Figure 4:
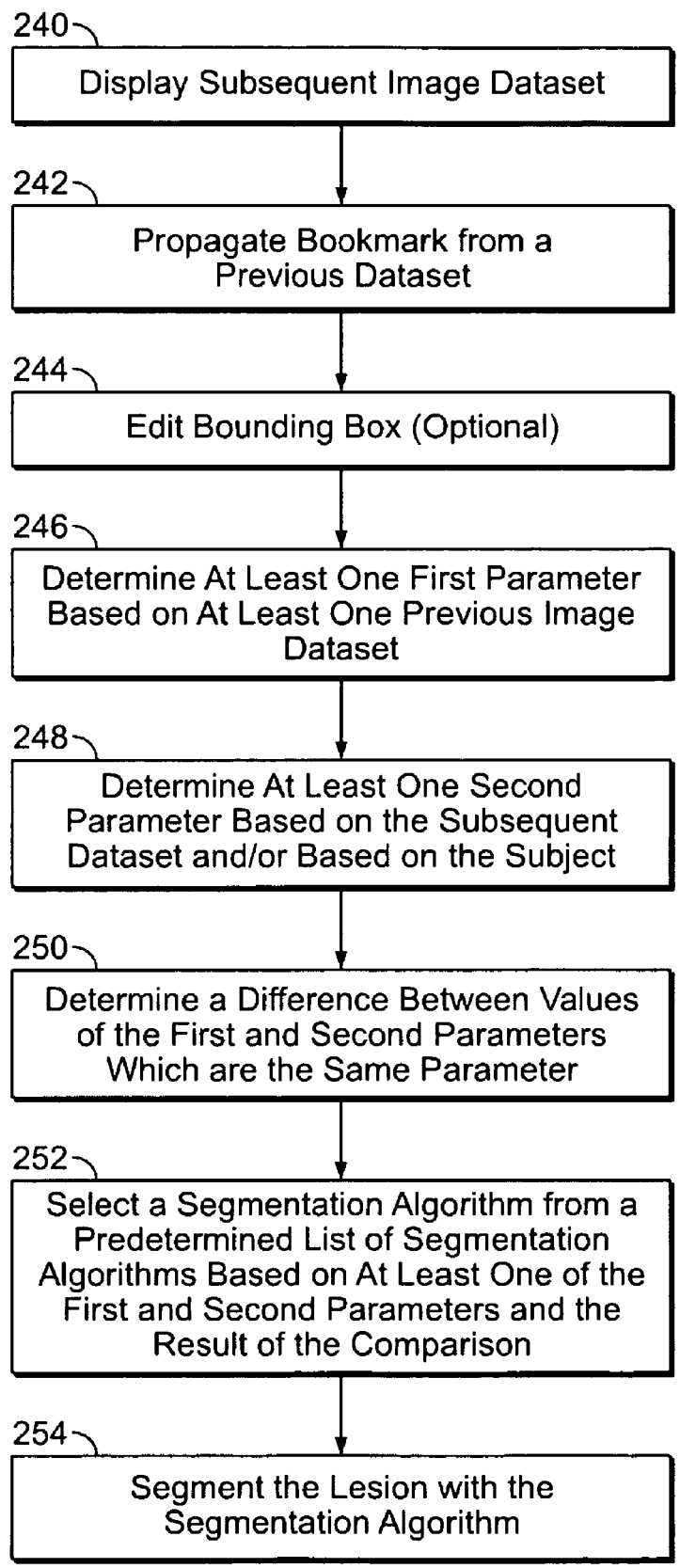
FIG. 4 illustrates a method for automatically selecting a segmentation algorithm for a subsequent exam based on contextual information in accordance with an embodiment of the present invention.

There are many cases in which a subsequent or follow-up exam is conducted to review the progress of a lesion. FIG. 4 illustrates a method for automatically selecting a segmentation algorithm for a subsequent exam based on contextual information. For example, the selection module 152 may use statistics based on a comparison of parameters between two exams, as well as the same lesion location on both image datasets, to segment a subsequent image dataset.

Figure 5:
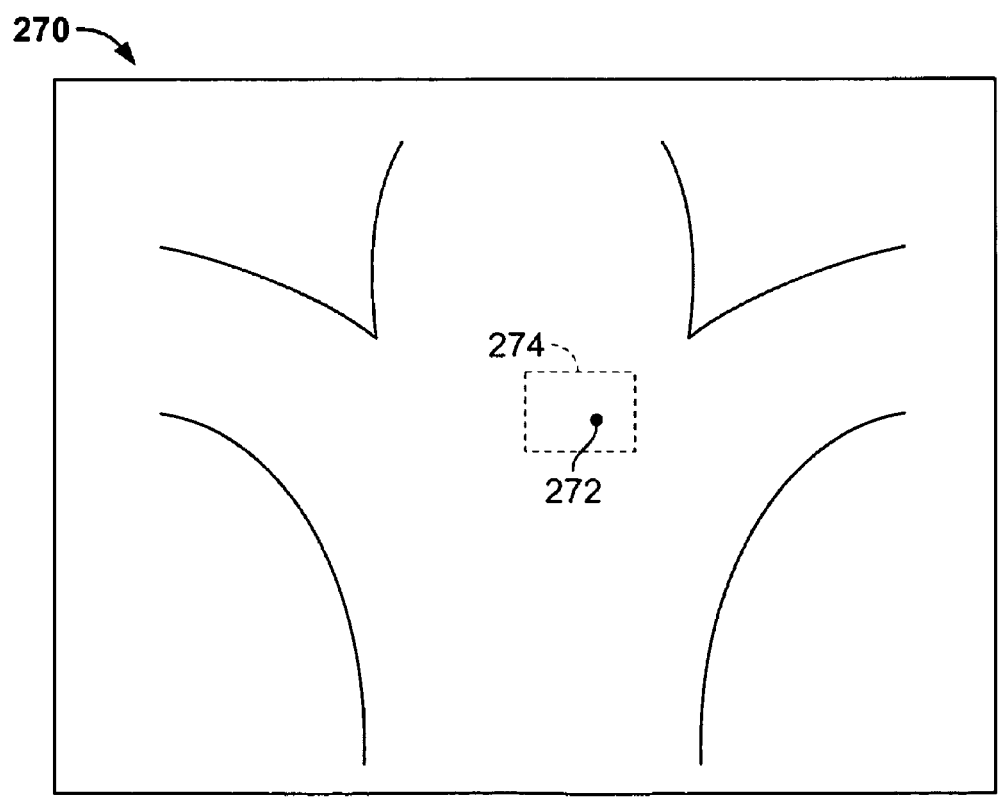
FIG. 5 illustrates an example of processing a subsequent image dataset having substantially the same anatomy as the image dataset of FIG. 3 in accordance with an embodiment of the present invention.

FIG. 5 illustrates an example of processing a subsequent image dataset 270 having substantially the same anatomy as the image dataset 220 of FIG. 3. At 240 of FIG. 4, the CPU 144 (FIG. 1) displays the subsequent image dataset 270 on the display 146. Optionally, the CPU 144 may simultaneously display the image datasets 220 and 270 in different viewports of the display 146.

At 242, the selection module 152 propagates the bookmark (created at 206 of FIG. 2) from the image dataset 220 (FIG. 3) to the subsequent image dataset 270. The propagation may be based on a previously accomplished anatomical registration, for example. By propagating the bookmark, an associated seed point 272 (FIG. 5) is placed on the subsequent image dataset 270 at the same anatomical location within the subject 109 as the seed point 224 to identify the same lesion. An associated bounding box 274 is defined having the same size and relativity to the associated seed point 272 as the seed point 224 has to the bounding box 226. Optionally, at 244, the user may edit the associated bounding box 274 using the input device 148. For example, the user may edit the size and/or position of the associated bounding box 274 based on image data specific to the subsequent image dataset 270.

The selection module 152 uses contextual information based on some or all of the image dataset 220, the subsequent image dataset 270, non-image data specific to the subject 109, and user-defined parameters. At 246, the selection module 152 may determine at least one first parameter based on at least one previous image dataset, such as the image dataset 220. The parameters were discussed previously at 208 of FIG. 2. It should be understood that more than one previous image dataset may be used.

At 248, the selection module 152 determines at least one second parameter based on at least one of the subsequent image dataset 270 and/or information associated with the subject 109. The first and second parameters may be based on the same item, function or aspect, such as an average or maximum SUV level within the bounding boxes 226 and 274, or the body of the subject 109. As discussed previously, parameters related to the subsequent image dataset 270 may be based on image data within the bounding box 274 or within the entire body of the subject 109, and may be within the parameters as discussed previously at 208 of FIG. 2, as well as other parameters associated with the subsequent image dataset 270.

Non-image parameters may be, for example, an acquisition parameter used when acquiring the subsequent image dataset 270, disease history, treatment history, and/or expected results of the treatment of the subject 109, as well as additional changes that have occurred between the time of the acquisition of the image dataset 220 and the subsequent image dataset 270. Optionally, the user may identify one or more user-defined parameters, such as a parameter based on user experience, user preference, the type of scan acquired, the anatomy and/or lesion 222 being scanned, and the like.

At 250, the selection module 152 may compare values of the first and second parameters if the same item or quantity was determined for both image datasets (or all, if more than two images are being used). The comparison may determine whether a difference between the parameters is beyond a predetermined threshold. For example, if may be advantageous to compare a maximum SUV level detected within each bounding box.

At 252, the selection module 152 selects a segmentation algorithm from within the segmentation algorithm module 154 based on at least one of the first and second parameters and the result of the comparison at 250. Alternatively, the selection module 152 may select the segmentation algorithm used to process the previous image dataset 220, and create a modified segmentation algorithm using at least one of the second parameters based on the subsequent image dataset 270.

At 254, the CPU 144 segments the lesion, based on the associated seed point 272. The result may be displayed on the display 146.

Figure 6:
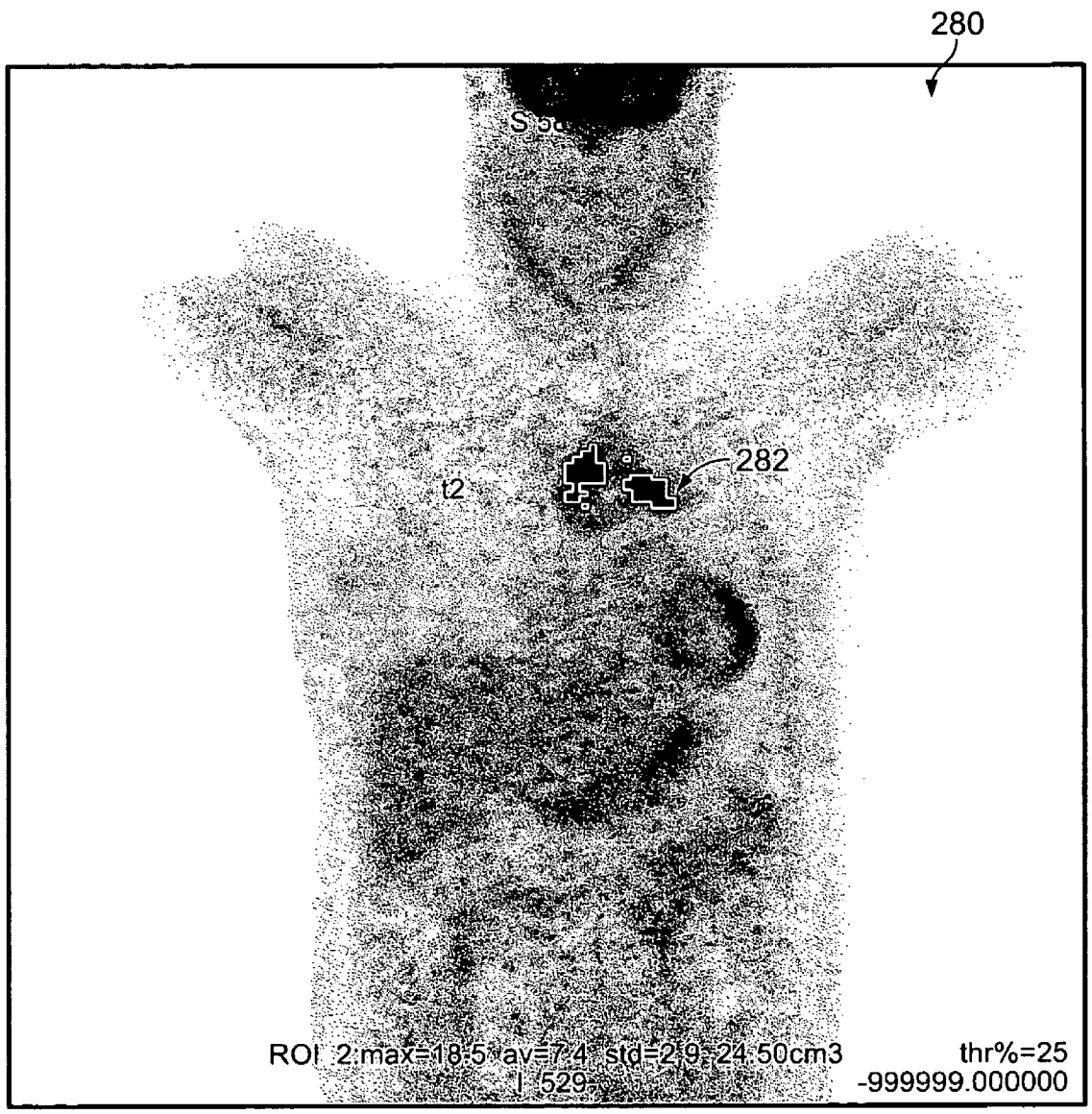
FIG. 6 illustrates a first image dataset of the subject having a segmented lesion there-within in accordance with an embodiment of the present invention.

FIG. 6 illustrates a first image dataset 280 of the subject 109 having a segmented lesion 282 there-within. The first image dataset 280 may be a baseline exam, for example. The first image dataset 280 may be processed based on the method of FIG. 2, wherein the segmentation algorithm used a relative threshold, which may be a threshold compared to a maximum value in a given region of interest (within a bounding box). The segmented lesion 282 may have a volume of 24.5 cm$^3$ and displays a much higher uptake than the surrounding area.

Figure 7:
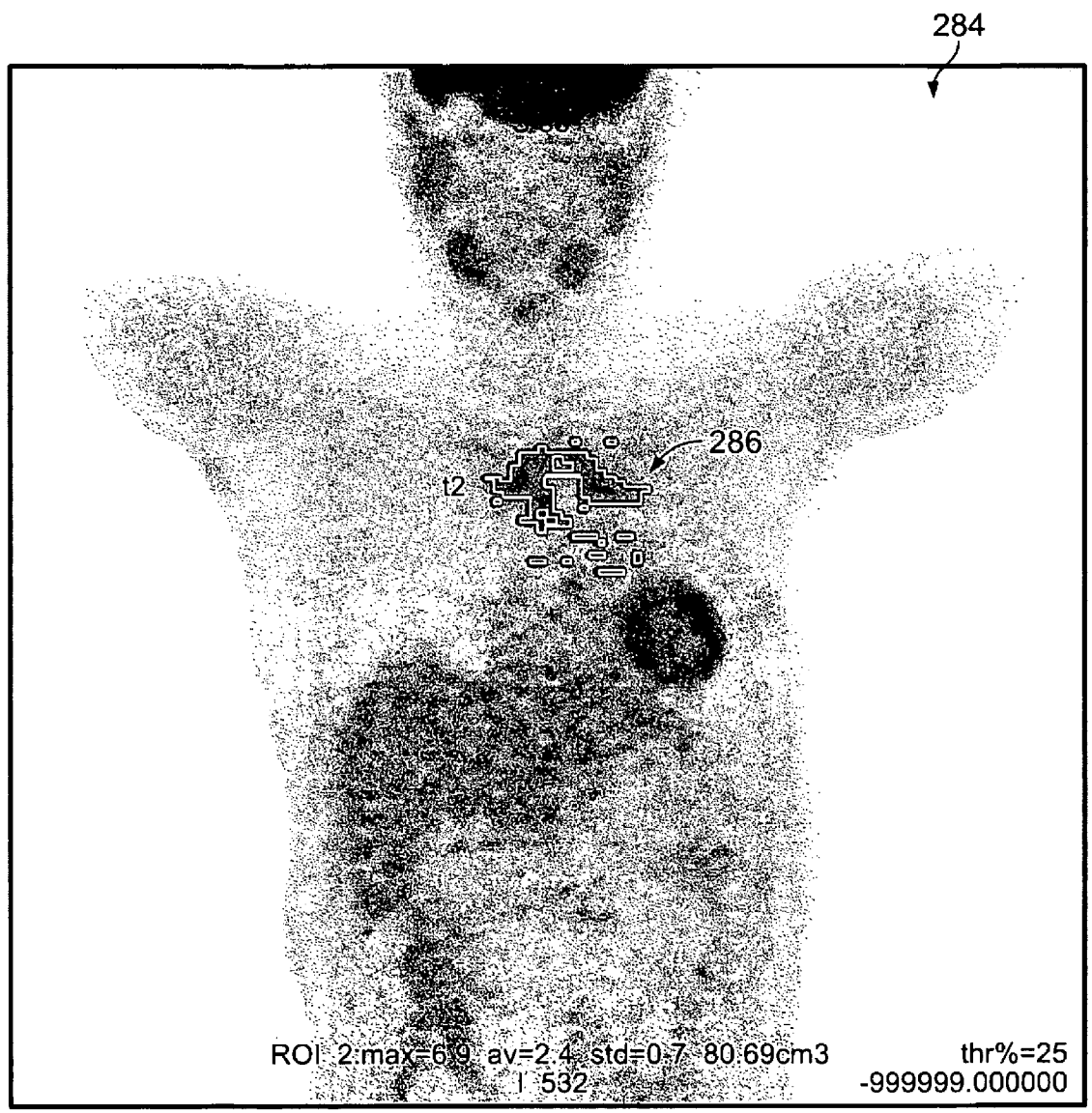
FIG. 7 illustrates a subsequent image dataset of the subject, which has been processed using the same context as the first image dataset in accordance with an embodiment of the present invention.

FIG. 7 illustrates a subsequent image dataset 284 of the subject 109 which has been processed using the same context as the first image dataset 280, such as the same segmentation algorithm and parameters. The subsequent image dataset 284 was acquired a period of time after the first image dataset 280, during which the subject 109 received treatment. The lesion is responding to treatment and has disappeared or is much smaller, and therefore does not have a higher uptake than the surrounding area. However, the contour of segmented lesion 286 within the subsequent image dataset 284 shows an increase to 80.7 cm$^3$, as the maximum SUV level in the region of interest is at the same level as the background. Therefore, as the context of the first image dataset 280 is not appropriate to the context of the subsequent image dataset 284, the lesion was not segmented properly. The user would have to reprocess the subsequent image dataset 284.

Figure 8:
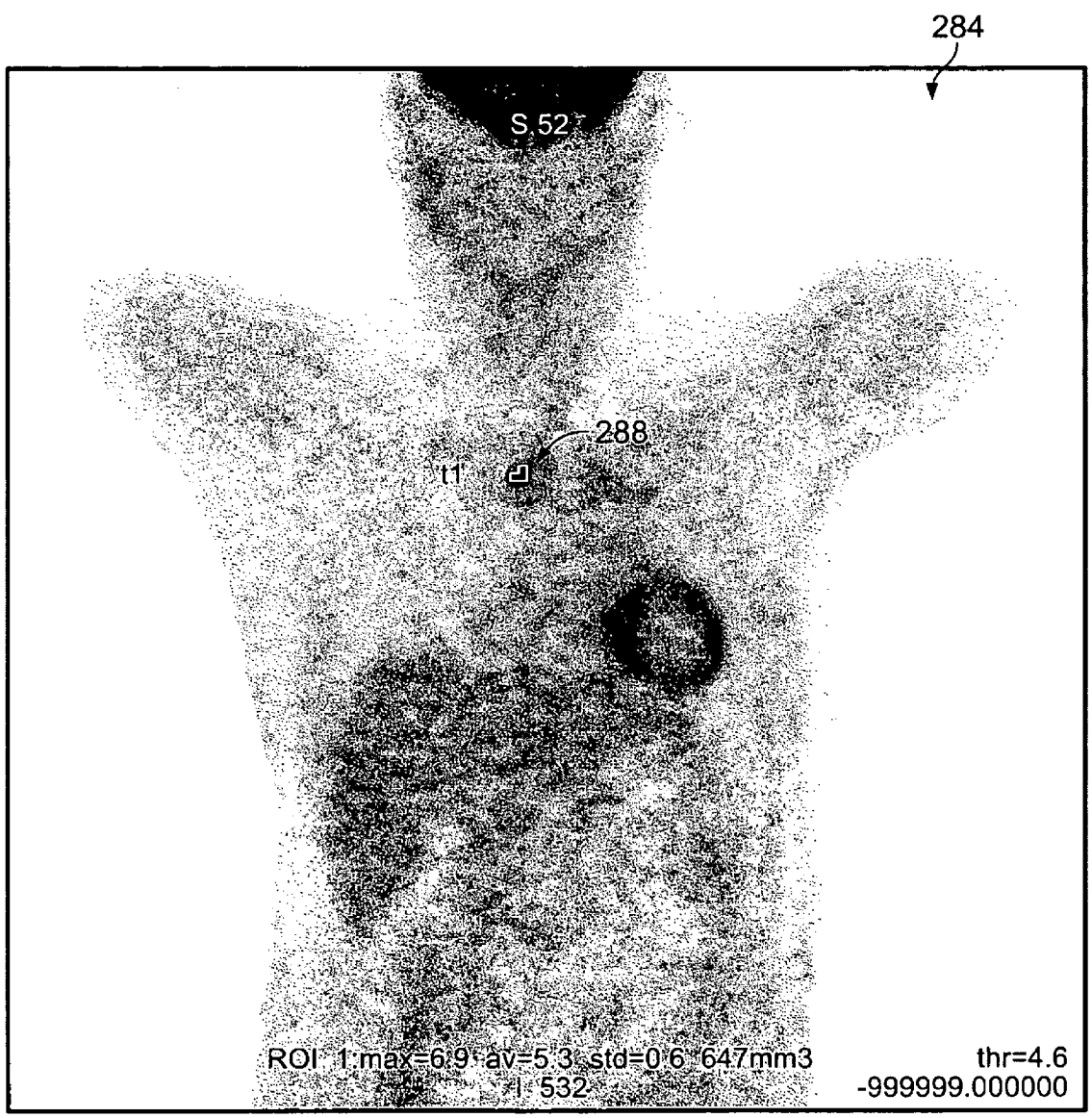
FIG. 8 illustrates the subsequent image dataset of the subject which has been processed using contextual information appropriate to the subsequent image dataset in accordance with an embodiment of the present invention.

FIG. 8 illustrates the subsequent image dataset 284 of the subject 109 which has been processed using contextual information appropriate to the subsequent image dataset 284. For example, the subsequent image dataset 284 may be processed using the method of FIG. 4. The selection module 152 may compare a maximum SUV level detected within the regions of interest of each of the first and subsequent image datasets 280 and 284. In this example, the difference between the maximum SUV levels is large. The selection module 152 may then use at least one parameter from the first image dataset 280 which indicates a confirmed malignancy, such as an absolute SUV threshold within the region of interest, rather than applying the relative threshold. Segmented lesion 288 now reflects the correct size of the lesion which has almost disappeared, a size of 0.64 cm$^3$. This corresponds to the visual representation of the subsequent image dataset 284 as reviewed by the user.

In another example (not shown), a lesion may preserve its size between exams, for example, by not responding to treatment or growing. Due to different exam conditions, such as variations due to decay, the tracer, and acquisition method differences, the average SUV levels may differ significantly between the two exams. Using the same SUV threshold for segmentation of a subsequent image dataset may indicate a change in the tumor volume which does not exist. If the selection module 152 adjusts the SUV threshold by normalizing between the first and subsequent image datasets, a more accurate tumor volume is segmented in the subsequent image dataset.

A technical effect is automatically selecting a segmentation algorithm based on contextual information. Lesions may change over time, along with other aspects of the image dataset. Therefore, a segmentation algorithm appropriate for an image dataset may be inaccurate when applied to a subsequent image dataset. The segmentation algorithm selection module may automatically determine parameters from image data of an image dataset or multiple image datasets, comparisons of parameters, as well as patient history and treatment data. The user may also enter user-defined parameters. The segmentation algorithm selection module then uses one or more of the parameters and/or comparison data to automatically select a segmentation algorithm for an image dataset.

While the invention has been described in terms of various specific embodiments, those skilled in the art will recognize that the invention can be practiced with modification within the spirit and scope of the claims.

What is claimed is:

1. A method for automatically processing a volumetric diagnostic image dataset, comprising:
defining a first seed point within a lesion, the lesion being within a first image dataset representative of a subject;
defining a first boundary in three dimensions within the first image dataset, the first seed point and the lesion being within the first boundary;
determining at least one parameter based on the first image dataset;
obtaining at least one preliminary lesion parameter;
selecting a first segmentation algorithm from a plurality of segmentation algorithms based on the at least one determined parameter and the at least one preliminary lesion parameter; and
segmenting the lesion using the first segmentation algorithm.

2. The method of claim 1, further comprising:
defining a second seed point and a second boundary on a second image dataset of the subject, the first and second image datasets comprising like anatomy, the second seed point and second boundary being positioned on the second image dataset based on positions of the first seed point and first boundary on the first image; and
segmenting image data within the second boundary based at least in part on the first image dataset, the first segmentation algorithm, and at least one subsequent parameter based on the second image dataset.

3. The method of claim 1, further comprising pre-segmenting the lesion within the first boundary, the at least one determined parameter or the at least one preliminary lesion parameter being based on a result of the pre-segmenting.

4. The method of claim 1, further comprising determining at least one second parameter based on at least one of an acquisition parameter used when acquiring the first image dataset, disease history based on the subject, treatment history of the subject, and expected results of the treatment of the subject, the segmenting being based at least partially on the at least one second parameter.

5. The method of claim 1, further comprising:
defining a second seed point and a second boundary on a second image dataset of the subject, the first and second image datasets comprising like anatomy, the second seed point and second boundary being positioned on the second image dataset based on positions of the first seed point and first boundary on the first image;
determining at least one subsequent parameter based on the second image dataset;
selecting a subsequent segmentation algorithm from the plurality of segmentation algorithms based on the at least one subsequent parameter, the at least one parameter of the first image dataset, and the first segmentation algorithm; and segmenting image data within the second boundary using the subsequent segmentation algorithm.

6. The method of claim 1, further comprising segmenting a second image dataset of the subject based on a comparison of at least one parameter associated with the first image dataset and the second image dataset.

7. The method of claim 1, further comprising:
defining a second boundary within a second image dataset, the first and second image datasets comprising like anatomy of the subject, the first and second boundaries surrounding a sub-set of like anatomy of the subject;
selecting a subsequent segmentation algorithm based at least on image data within the second boundary and image data within the first boundary; and
segmenting the image data within the second boundary using the subsequent segmentation algorithm.

8. A system for automatically segmenting a lesion within a positron emission tomography (PET) image dataset, comprising:
a display for displaying a volumetric PET image dataset of a subject;
an input device for defining a seed point within a lesion on the image dataset displayed on the display;
a CPU coupled to the display and the input device, the CPU defining a three dimensional bounding box around the lesion within the image dataset; and
a segmentation algorithm selection module coupled to the CPU, the selection module being configured to:
detect at least one parameter associated with at least one of image data within the image dataset and data associated with the subject;
obtain at least one preliminary lesion parameter; and
select a segmentation algorithm from a predetermined list of segmentation algorithms based on the at least one determined parameter and the at least one preliminary lesion parameter, the CPU segmenting the lesion with the segmentation algorithm.

9. The system of claim 8, wherein the data associated with the subject comprises non-image data.

10. The system of claim 8, wherein the at least one parameter is based on image data within the bounding box.

11. The system of claim 8, further comprising:
the display displaying a subsequent image dataset comprising like anatomy with respect to the image dataset; and
the selection module automatically selecting the segmentation algorithm based at least in part on a comparison of the image dataset and the subsequent image dataset.

12. The system of claim 8, further comprising:
the display displaying a subsequent image dataset comprising like anatomy with respect to the image dataset; and
the selection module automatically defining a subsequent seed point and a subsequent bounding box within the subsequent image dataset based on the seed point and the bounding box of the image dataset, the selection module selecting the segmentation algorithm based at least in part on a comparison of the image data within the bounding box and image data within the subsequent bounding box.

13. The system of claim 8, further comprising:
the display displaying a subsequent image dataset comprising like anatomy with respect to the image dataset;
the selection module defining at least one second parameter based on at least a portion of the subsequent image dataset, the selection module modifying the segmentation algorithm based on the at least one second parameter to determine a modified segmentation algorithm; and
the CPU processing the subsequent image dataset with the modified segmentation algorithm.

14. The system of claim 8, further comprising:
the display displaying a subsequent image dataset comprising like anatomy with respect to the image dataset;
the selection module detecting a first and second parameter based on the image dataset and the subsequent image dataset, respectively, the selection module comparing the first and second parameters to identify a difference beyond a predetermined threshold associated with the parameter, the selection module selecting the segmentation algorithm based at least in part on the difference.

* * * * *